United States Patent [19]
Wilson

[11] Patent Number: 5,464,264
[45] Date of Patent: Nov. 7, 1995

[54] PICKUP-TRUCK CARGO BED, CONVERTIBLE FROM FULLY OPEN TO PARTIALLY ENCLOSED

[76] Inventor: Raymond T. Wilson, 3 Lincoln Ct., Amesbury, Mass. 01913-3311

[21] Appl. No.: 283,687

[22] Filed: Aug. 1, 1994

[51] Int. Cl.⁶ ....................................................... B60R 9/00
[52] U.S. Cl. ...................... 296/37.6; 296/37.14; 296/24.1
[58] Field of Search ................................ 296/37.6, 37.14, 296/37.2, 24.1; 224/42.42

[56] References Cited

U.S. PATENT DOCUMENTS

| | | | |
|---|---|---|---|
| 3,485,522 | 12/1969 | Reinarts | 296/24 |
| 4,288,011 | 9/1981 | Grossman | 224/42.42 |
| 4,451,075 | 5/1984 | Canfield | 296/37.6 |
| 4,488,669 | 12/1984 | Waters | 224/273 |
| 4,506,870 | 3/1985 | Penn | 296/37.6 X |
| 4,580,827 | 4/1986 | Feagan | 296/37.6 |
| 4,749,226 | 6/1988 | Heft | 296/37.6 |
| 4,750,773 | 6/1988 | Chapline et al. | 296/37.5 X |
| 4,770,330 | 9/1988 | Bonstead et al. | 224/42.42 |
| 4,789,197 | 12/1988 | Lewis | 296/100 |
| 4,828,312 | 5/1989 | Kinkel et al. | 296/37.6 |
| 4,892,346 | 1/1990 | Berlin | 296/37.6 |
| 4,917,430 | 4/1990 | Lawrence | 296/37.6 |
| 4,936,624 | 6/1990 | West | 296/37.6 |
| 4,938,398 | 7/1990 | Hallsen | 224/42.42 |
| 4,943,194 | 7/1990 | Aguilar | 296/37.6 X |
| 4,946,217 | 8/1990 | Steffens et al. | 296/100 |
| 4,967,944 | 11/1990 | Waters | 224/273 |
| 5,169,200 | 12/1992 | Pugh | 296/37.6 |
| 5,188,414 | 2/1993 | Burnham et al. | 296/37.6 |
| 5,201,561 | 4/1993 | Brown | 296/37.6 X |

Primary Examiner—Joseph D. Pape

[57] ABSTRACT

An improved cargo bed for pickup trucks is built by the truck manufacturer to include movable panels which allow the cargo bed to be quickly and easily converted, without tools, from a partially-enclosed position to a fully-open position. In the partially-enclosed position, the forward section of the cargo bed becomes a secure, weather-resistant "trunk" for luggage, etc., the rest of the cargo bed remaining open. In the fully-open position, the cargo bed is nearly identical to that of an ordinary pickup truck, but with a small auxiliary storage compartment underneath the forward section of the cargo bed. Storage space is provided in the cargo bed for the movable panels, so they are available any time they are needed.

8 Claims, 6 Drawing Sheets

PICKUP-TRUCK CARGO BED, CONVERTIBLE FROM FULLY OPEN TO PARTIALLY ENCLOSED

BACKGROUND

1. Field of the Invention

This invention relates to pickup trucks, specifically to a pickup-truck cargo bed which is built by the truck manufacturer to be convertible—from a fully-open position for carrying cargo, to a partially-enclosed position providing a storage compartment like the trunk of a passenger car.

2. Description of Prior Art

Most pickup trucks are built with the driver's and passengers' seats so close to the rear wall of the cab that the trucks have very little storage space that is enclosed, secure and weather-resistant, like the trunk of a passenger car.

Some pickup trucks are built with their cabs extended rearward to provide such storage space; but this is a costly option which makes a truck longer and less maneuverable. Moreover, the storage space in the rear of an extended-cab pickup truck is visible from outside the truck, which makes it less secure; and accessible only from inside the cab, which makes it less convenient.

U.S. Pat. No. 4,917,430 to Lawrence discloses a design for an after-market conversion for an extended-cab pickup truck. This design provides a small, externally accessible storage space in the area of the cab behind the seats. However, this design further complicates an already expensive option, and still leaves the truck longer and less maneuverable.

Many kinds of after-market storage units have been devised which can be installed in the cargo bed of a pickup truck to provide an enclosed, secure, weather-resistant storage compartment.

The units shown in U.S. Pat. No. 4,288,011 to Grossman, U.S. Pat. No. 4,488,669 to Waters, U.S. Pat. No. 4,770,330 to Bonstead et al., and U.S. Pat. No. 4,967,944 to Waters are examples of one type of such unit, the "straddle-bed" box, which is typically attached on top of the forward section of a cargo bed's side walls. Straddle-bed boxes suffer from several disadvantages. They may impede the rearward vision of short drivers. Their secure installation generally requires modification of the cargo bed, which was not designed to accept them. They are neither structurally nor esthetically integrated into the design of the pickup truck. Above all, if the entire cargo bed is needed for cargo, they get in the way and must either be put up with, or removed. If they are removed and left behind, they may well be unavailable when needed.

U.S. Pat. No. 4,936,624 to West discloses a variation of a straddle-bed box in which two rather small tool receptacles are arranged so as to be moved up and down between access positions and secured positions by hydraulic lifts. West's design extends very little above the top of the pickup-truck bed, so it would not significantly impede the rearward vision of short drivers; but it suffers from all the other disadvantages mentioned above in the discussion of straddle-bed boxes. It is a specialized piece of after-market equipment which would be useful for some persons who must work with heavy tools, for example; but it would be expensive to build, it offers very little effective enclosed storage space, and its complexity tends to make it a system which would be more or less permanently installed, occupying a significant portion of the open cargo space in the cargo bed.

U.S. Pat. No. 4,580,827 to Feagan discloses an "apparatus for storage compartmentation in combination with" a straddle-bed box. This design does make possible an additional enclosed space underneath and behind the straddle-bed box, but it suffers from all the limitations of that type of storage unit.

U.S. Pat. No. 3,485,522 to Reinarts and U.S. Pat. No. 4,892,346 to Berlin disclose units similar to straddle-bed boxes, except that they are extended vertically to substantially the height of the pickup-truck cab. These units may serve as auxiliary cabs, but they are large and bulky, and they suffer from all the disadvantages of straddle-bed boxes.

U.S. Pat. No. 4,451,075 to Canfield, U.S. Pat. No. 4,506,870 to Penn, U.S. Pat. No. 4,749,226 to Heft, U.S. Pat. No. 4,828,312 to Kinkel et al., and U.S. Pat. No. 4,938,398 to Hallsen disclose various types of storage units designed to be installed in the rearmost section of a pickup truck's cargo bed. These units suffer from three serious disadvantages: first, their location all the way in the rear of the pickup truck subjects items stored in them to the most severe vibration experienced anywhere on the truck; second, heavy loads stored in them, being behind the truck's rear wheels, will tend to lift the truck's front wheels, with possible dangerous effects on the truck's handling; third, they make it impossible to slide objects into the cargo bed over the lowered tailgate. The Penn patent, moreover, is limited in its use to trucks having "substantially vertical side walls," i.e. with the rear fenders outboard of the side walls. Few pickup trucks these days are built that way.

U.S. Pat. No. 4,789,197 to Lewis and U.S. Pat. No. 4,946,217 to Steffens et al. relate to covers which can enclose the entire bed of a pickup truck. However, covers of this type must be opened if bulky cargo is to be carried, leaving no space in the cargo bed secure and weather-resistant.

U.S. Pat. No. 4,943,194 to Aguilar discloses an after-market "modularized system for enclosing selected portions of a pickup truck bed". As pictured, this system requires permanently attaching at least eight pieces of hardware to the truck bed. Selected portions of the bed are then enclosed by attaching three to seven additional assemblies to the permanently-attached items. No provision is shown for storing these additional assemblies aboard the truck.

U.S. Pat. No. 4,750,773 to Chapline et al. discloses a storage-box kit for installation in the forward section of a cargo bed. This design incorporates into the storage box the floor, left and right sides, and forward wall of the cargo bed. It adds a rear panel which when not in use folds down to lie on the bed's floor, and a lid which when not in use folds down against the bed's forward wall. The design would be very difficult to make weather-resistant. Moreover, when the rear panel is folded down onto the floor, objects being pushed forward along the floor would hit the edge of the rear panel, perhaps causing damage, or have to be lifted over the edge.

U.S. Pat. No. 5,169,200 to Pugh discloses another storage-box kit for installation in the forward section of a cargo bed. This design incorporates into the storage box the floor, left and right sides, and forward wall of the cargo bed. It adds a three-piece rear panel, a lid, and a number of other parts, some more or less permanently installed in the cargo bed, and some removable. The design would be very difficult to make weather-resistant, and its large number of pieces would be an inconvenience. Moreover, when its pieces are removed to allow the whole bed to be filled with cargo, they have no storage space provided aboard the truck, so they must be brought along in some improvised way, or left behind.

U.S. Pat. No. 5,201,561 to Brown discloses another storage-box kit for installation in the forward section of a cargo bed. It is less complicated than Pugh, and larger, but it suffers from similar disadvantages.

U.S. Pat. No. 5,188,414 to Burnham et al. discloses a pickup truck built at the factory with "an auxiliary load compartment . . . intermediate a load box and the conventional pick-up truck cab." This design would make a truck longer and less maneuverable, with its auxiliary load compartment permanently taking up a major part of the space that otherwise could be used for bulky cargo. Furthermore, the installation of a truck cap or similar enclosure over the entire cargo bed would make it impossible to open the doors of the auxiliary load compartment.

OBJECTS AND ADVANTAGES

Accordingly, several objects and advantages of the present invention are:

(a) to provide for the cargo bed of a pickup truck a storage compartment built-in at the factory and thus structurally and esthetically integrated into the design of the pickup truck;

(b) to provide a storage compartment that is enclosed, weather-resistant and secure, like the trunk of a passenger car;

(c) to provide that storage compartment in the forward section of the cargo bed, so that items carried therein have as smooth a ride as possible, so that their weight detracts the least possible from the truck's handling, and so that the cargo bed remains open at the rear for ease in loading;

(d) to provide a storage compartment low enough in overall height so as not to impede the rearward vision of short drivers;

(e) to provide a storage compartment which can be dismantled or folded away; quickly, easily, and without tools; by rearranging no more than two (2) parts, converting the cargo bed from a partially-enclosed position to a fully-open position when the whole cargo bed is needed for carrying cargo;

(f) to provide built-in storage on the pickup truck for all parts of the dismantled storage compartment, so that when the storage compartment is needed again the cargo bed can be quickly converted from the fully-open position to to the partially-enclosed position;

(g) to provide, when the convertible cargo bed is converted to the fully-open position, a cargo bed which closely resembles the cargo bed of an ordinary pickup truck;

(h) to provide a convertible pickup-truck cargo bed the design of which is compatible with all styles of cargo beds; whether with the exterior faces of the cargo bed's sides substantially flush with the exterior faces of the sides of the pickup-truck cab and the rear wheels covered by wheel wells inside the cargo bed, or with the cargo bed having substantially vertical side walls with rear wheels and fenders outboard of them;

(j) to provide a convertible pickup-truck cargo bed the design of which permits it to be used with any style of pickup-truck cab, namely standard cab, extended cab, or crew cab;

(k) to provide a storage compartment which can be made weather-resistant when the cargo bed is converted to the partially-enclosed position;

(l) to provide a convertible cargo bed which can be used in conjunction with a truck cap or similar enclosure which covers the entire cargo bed;

(m) to provide, when the cargo bed is converted to the partially-enclosed position, an enclosed storage compartment with a lid assembly mounted transversely on top of that storage compartment and hinged at the longitudinal centerline of the pickup truck into two (2) substantially identical lid-halves permitting access to that storage compartment from both sides of the pickup truck;

(n) to provide that lid assembly with a catching or grabbing mechanism at its hinged joint which securely fastens the lid assembly to the front and rear walls of the storage compartment, but which releases its hold when both lid-halves are lifted at the same time, thus permitting easy removal of the lid assembly and conversion of the cargo bed from the partially-enclosed position to the fully-open position;

(p) to provide the storage compartment with a laterally extending rear panel which meets the floor of the cargo bed at a transverse hinge on which the rear panel can be folded forward and down until it becomes substantially flush with that floor, to permit the conversion of the cargo bed from the partially-enclosed position to the fully-open position;

(q) to provide the lid assembly with a storage recess in the aft face of the cargo bed's front wall, in which the lid assembly is held captive by the laid-down rear panel when the cargo bed is converted to the fully-open position;

(r) to provide a master latching/locking mechanism whereby the laid-down rear panel and the lid assembly can be locked in place when the cargo bed is converted to the fully-open position;

(s) to provide an auxiliary storage compartment underneath the folded-down rear panel when the cargo bed is converted to the fully-open position, such auxiliary compartment being enclosed from below by a floor pan shaped to clear the pickup truck's frame, exhaust system, driveshaft, etc.;

(t) to provide, when the cargo bed is converted to the partially-enclosed position, an enclosed storage space extending vertically from the floor pan all the way up to the underside of the lid assembly and thus (in a full-size American pickup truck) having about the same volume as the trunk of a full-size American sedan and about twice the volume of a bolt-on, after-market storage box; and (u) to provide the rear panel of the enclosed storage compartment, where it meets the floor of the cargo bed, with a hinge which can be detached from the floor of the cargo bed, allowing the rear panel to be removed entirely from the truck and permitting the auxiliary compartment to facilitate the installation of an additional passenger seat (with appropriate safety measures) in the cargo bed by serving as space for passengers' feet.

These and other features of the convertible pickup-truck cargo bed of this invention will be apparent to those skilled in the light-truck-body arts upon reading the following description with reference to the accompanying drawings.

BRIEF DESCRIPTION OF THE DRAWINGS

In the drawings, closely related figures have the same number but different alphabetic suffixes.

REFERENCE NUMERALS IN THE DRAWINGS 9 rear wall of pickup-truck cab
10 right-side wall of pickup-truck cargo bed
12 left-side wall of pickup-truck cargo bed
14 floor panel of cargo bed
16 tailgate
18 tailgate latching handle
20 lid assembly
22 lid-half
24 rear panel of enclosed storage compartment
26 lid-half latch
28 drainage hole in floor of cargo bed
30 side door of pickup-truck bed
32 master latch
34 "open" position of lid-halves
36 "convert" position of lid-halves
37 frame of pickup truck
38 front wall of cargo bed
39 driveshaft of pickup truck
40 auxiliary storage compartment
41 exhaust system of pickup truck
42 floor pan for auxiliary enclosed compartment
44 groove in lid-half
56 gasket
48 tongue
50 pin
52 claw
54 hinge knuckle
56 hinge pin

DESCRIPTION OF THE INVENTION

Figure 1A:
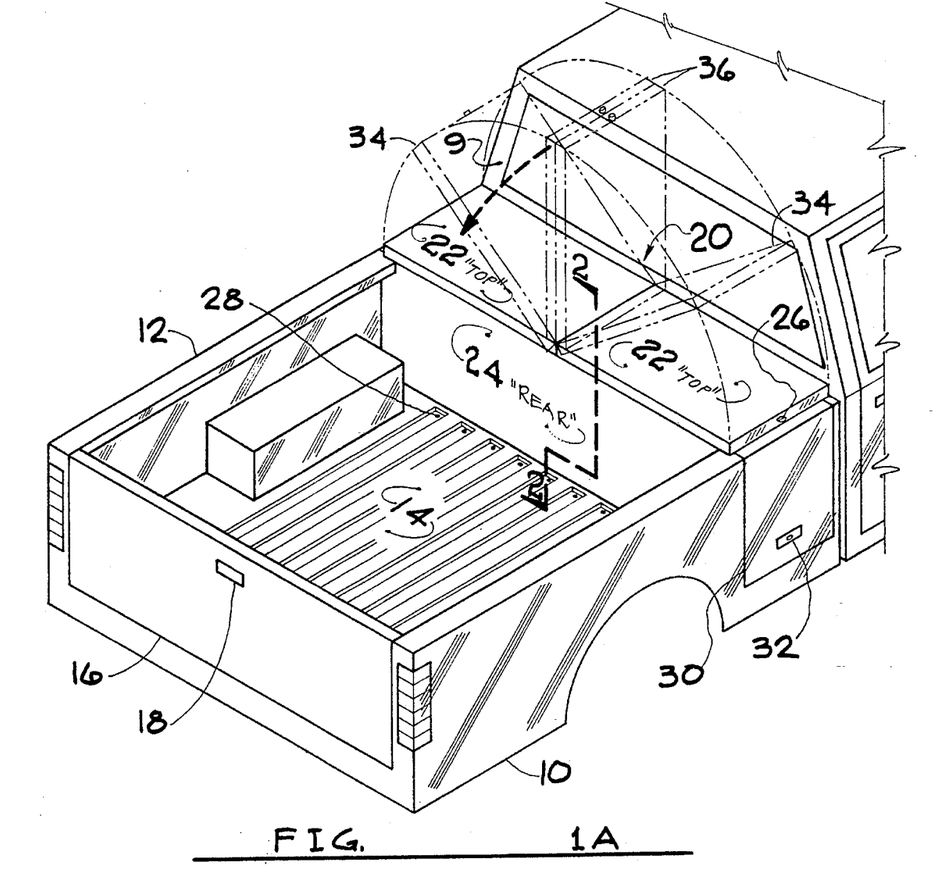
FIG. 1A is an isometric view of a pickup truck equipped with the preferred embodiment of the convertible pickup-truck cargo bed, showing the bed converted to the partially-enclosed position.

FIG. 1A is an isometric view of a pickup truck equipped with the convertible pickup-truck cargo bed. The bed is shown converted to the partially-enclosed position. Except for the bed, the subject of this invention, the pickup truck is of conventional construction, and includes a cab having a rear wall 9. The bed has a right-side wall 10, a left-side wall 12, a corrugated floor panel 14, and at the rear a tailgate 16 capable of being opened by means of a latching handle 18 and swung down, on hinges along its bottom edge, to a substantially horizontal position. All this is exactly as in any ordinary pickup truck.

FIG. 1A also shows several features of the convertible cargo bed of this invention. These include: a lid assembly 20 mounted transversely on top of the forward section of the cargo bed and hinged at the truck's longitudinal centerline into two (2) substantially identical lid-halves 22, thus permitting access to the enclosed storage compartment from both sides of the pickup truck; a vertical rear panel 24; and on the distal end of each lid-half a lid-half latch 26. Note that lid-halves 22 are marked to show their "TOP" faces and that rear panel 24 is marked to show its "REAR" face; this will help clarify FIGS. 1B and 1C.

As an option, a number of drainage holes 28 in the grooves of floor panel 14 serve to help keep water from getting into the enclosed storage compartment. As a further option, there could also be a side door 30 on one or both sides of the forward section of the convertible cargo bed, hinged at either its forward or bottom edge, to permit easier access to the enclosed storage compartment. A master latch 32 is used during conversion of the cargo bed from one position to the other. Additionally, lid-halves 22 are shown with phantom lines, raised to "open" position 34 and "convert" position 36.

FIG. 1A also indicates the first step in the conversion of the convertible pickup-truck bed from the partially-enclosed position to the fully-open position. This conversion is done by hand, in seconds, and without tools, in the following way: lid-halves 22 are raised to "convert" position 36, automatically releasing lid assembly 20 to be removed from the pickup-truck bed. Next, the distal ends of lid-halves 22 are moved rearward and downward, as shown by the dashed, curved arrow in FIG. 1A, until folded lid assembly 20 is positioned approximately vertically and centered on the pickup-truck bed, as shown at "B1" in FIG. 1B.

Figure 1B:
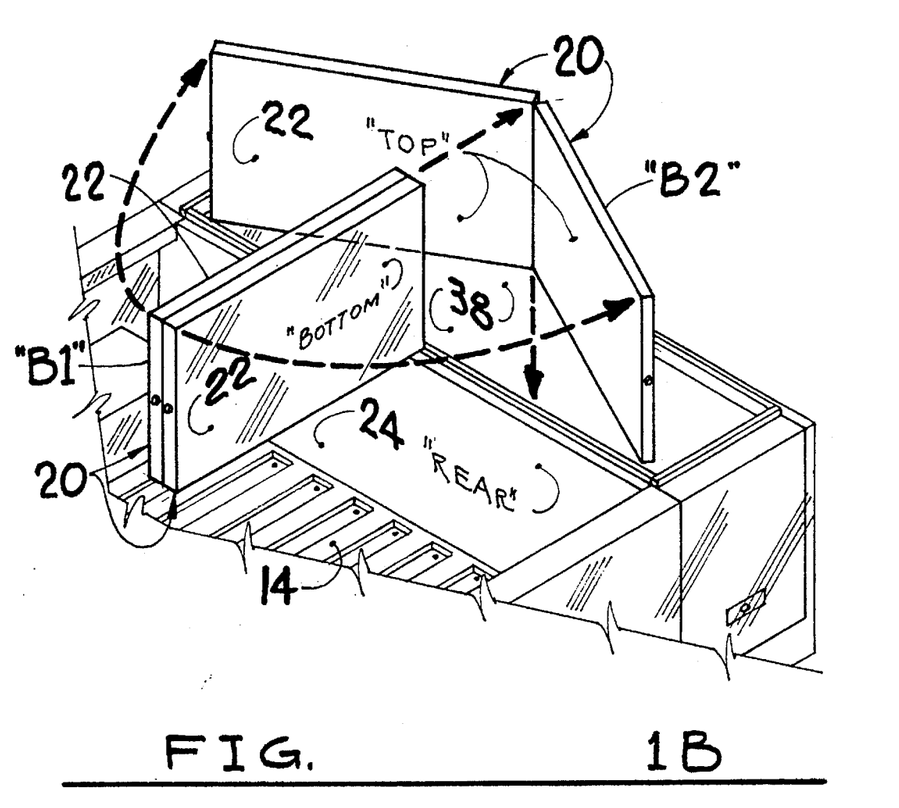
FIG. 1B is a partial isometric view showing steps in the conversion of the bed from the partially-enclosed position to the fully-open position.
Figure 1C:
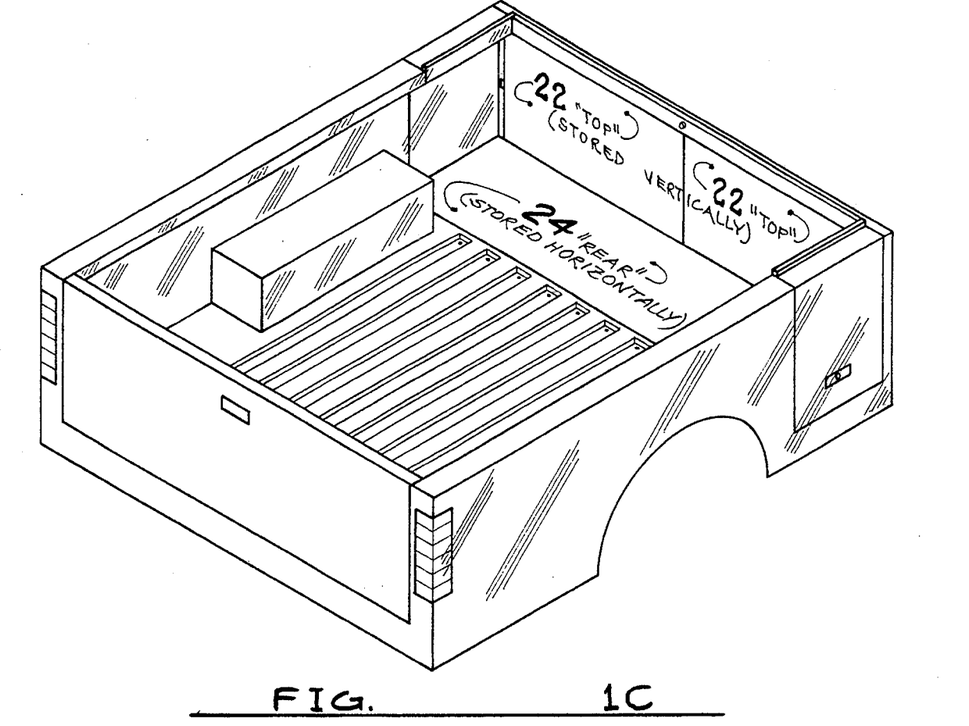
FIG. 1C is an isometric view showing the bed converted to the fully-open position.

FIG. 1B is a partial isometric view showing the next steps in the conversion from the partially-enclosed position to the fully-open position. Starting from "B1," lid assembly 20 is brought forward and lid-halves 22 are swung apart hingedly, as shown by the dashed arrows, until lid assembly 20 is in the position shown at "B2" in FIG. 1B. Next, lid assembly 20 is lowered into the enclosed storage space it previously covered, as shown by the vertical dashed arrow. Next, lid-halves 22 are swung forward hingedly until lid assembly 20 is substantially vertical and parallel to cargo-bed front wall 38. Next, lid assembly 20 is moved forward into its storage recess in front wall 38. Next, rear panel 24 is swung hingedly forward and downward until it is substantially flush with floor 14, as shown in FIG. 1C. Conversion of the bed back to the partially-enclosed position is the reverse of the above procedure.

FIG. 1C is an isometric view of the convertible cargo bed, showing the bed converted to the fully-open position. Lid-halves 22 are shown stored in a recess in the aft face of cargo-bed front wall 38, their "TOP" faces (in FIG. 1A) exposed to view. Rear panel 24 is shown laid down substantially horizontal and substantially flush with cargo-bed floor 14, its "REAR" surface (in FIG. 1A) exposed to view. All other parts shown are the same as in FIG. 1A. Note that the cargo bed when converted to the fully-open position closely resembles the bed of an ordinary pickup truck.

Figure 2:
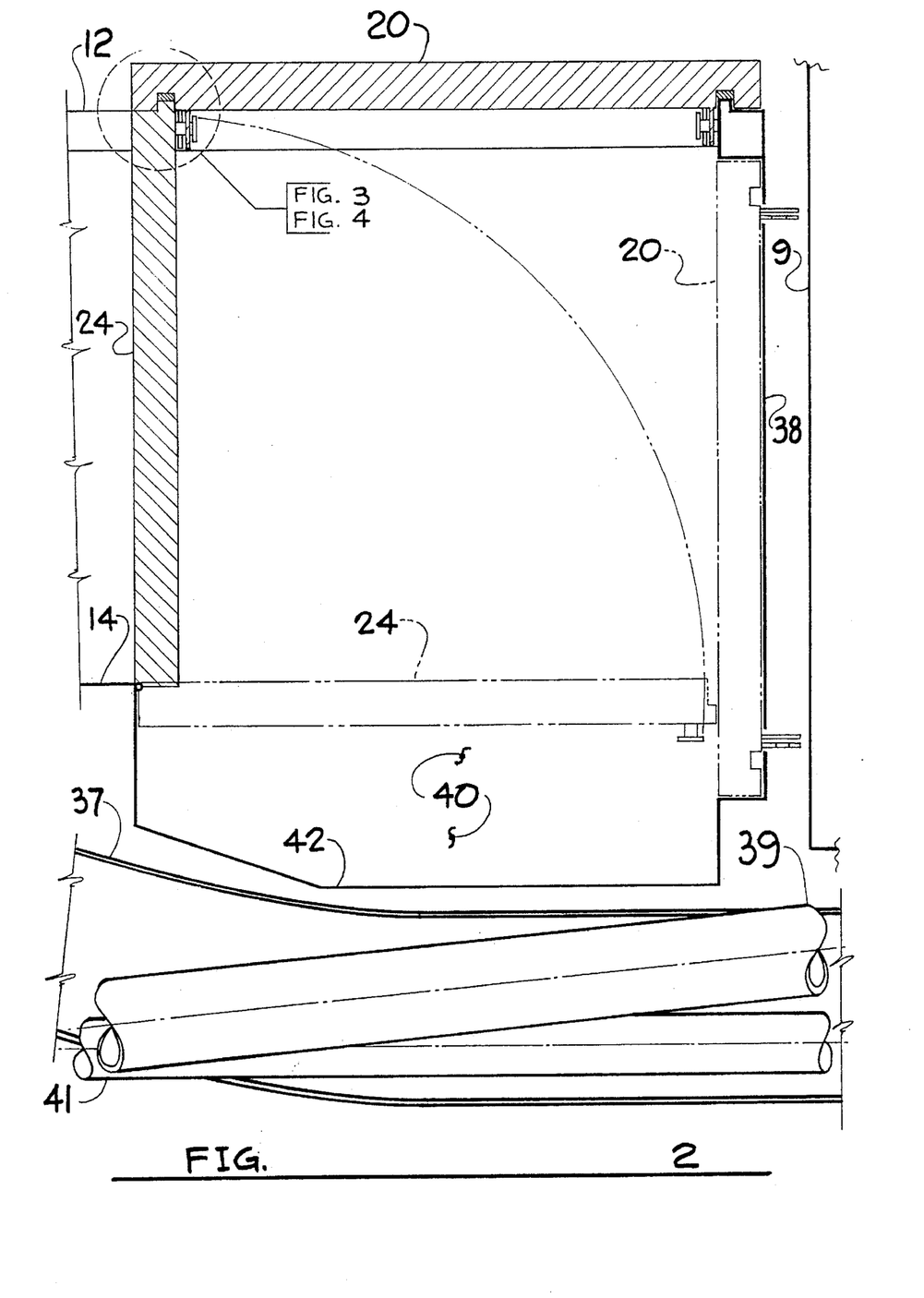
FIG. 2 is a transverse section cut through the convertible forward section of the bed.

Section symbol "2—2" in FIG. 1A indicates a transverse section cut through the convertible forward section of the cargo bed and designated FIG. 2.

In FIG. 2, the two parts that are movable, namely lid assembly 20 and rear panel 24, are shown with solid lines in the partially-enclosed position, and with phantom lines in the fully-open position.

In the fully-open position, lid assembly 20 is shown stored in a recess provided in the aft face of cargo-bed front wall 38. Similarly, rear panel 24 is shown laid down to a position substantially horizontal and substantially flush with truck-bed floor 14, where it is locked in place by master latch 32 (not shown), and where it in turn locks lid assembly 20 in place.

As lid assembly 20 extends down past laid-down rear panel 24, it makes possible the creation of an auxiliary storage compartment 40 beneath laid-down rear panel 24. This auxiliary storage compartment is enclosed from below by a floor pan 42, which is shaped to clear the truck's frame 37, driveshaft 39, and exhaust system 41.

Figure 3:
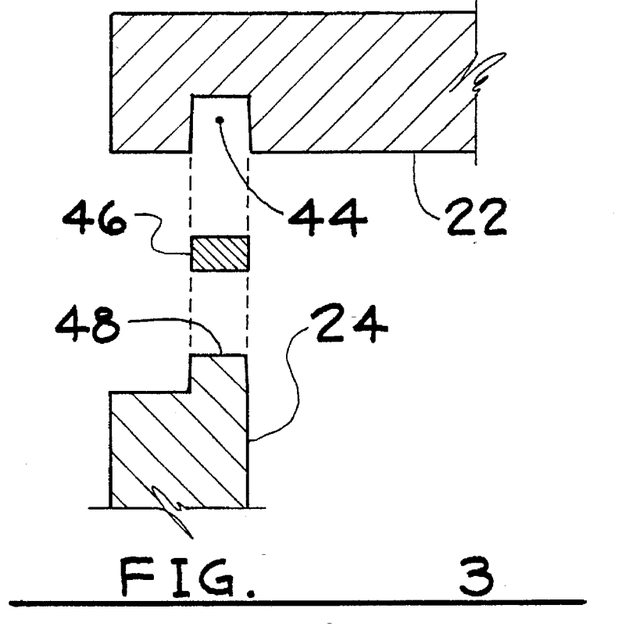
FIG. 3 is an enlarged transverse section showing the tongue-and-groove engagement of all four sides of the enclosed storage compartment with the lid assembly.
Figure 4:
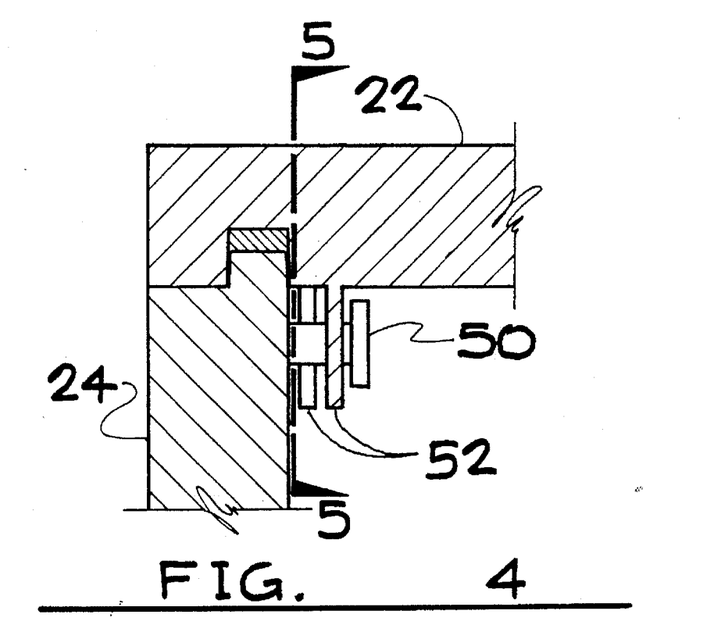
FIG. 4 is an enlarged transverse section showing the mechanism that fastens the hinged middle of the lid assembly down to the front and rear walls of the enclosed storage compartment.

The dashed circle in FIG. 2 defines an area shown as enlarged transverse sections in FIG. 3 and FIG. 4.

FIG. 3 shows an exploded sectional view of right-hand lid-half 22 meeting rear panel 24 when the bed is converted to the partially-enclosed position. Lid-half 22 has a groove 44 near and parallel to each of its exterior faces. In groove 44 is a conventional compressible gasket 46 to keep water and dust out of the enclosed storage compartment. All the surfaces that mate with the edges of lid-halves 22 are provided with tongues 48; thus when lid-halves 22 are closed, tongues 48 go partway into grooves 44 to compress gaskets 46. This configuration occurs wherever a lid-half 22 meets right-side wall 10, or left-side wall 12, or rear panel 24, or side door 30, or front wall 38. When both lid-halves 22 are down in the closed position, they and all four sides of the enclosed space are locked together and restrained from moving horizontally relative to each other by the engagement of tongues 48 into grooves 44.

FIG. 4 shows the catching or grabbing mechanism which is a crucial part of the convertible pickup-truck cargo bed. The grabbing mechanism includes a pin 50 attached to rear panel 24, and a similar pin 50 attached to front wall 38 (not shown). At each pin 50 is hook or claw 52 attached to each lid-half 22. Thus, each end of the hinged joint in the middle of lid assembly 20 has a pair of claws 52 to grab and hold pin 50 from opposite sides, securely fastening the hinged middle of the lid assembly to the front wall 38 (not shown) and rear panel 24 of the enclosed storage compartment.

Figure 5A:
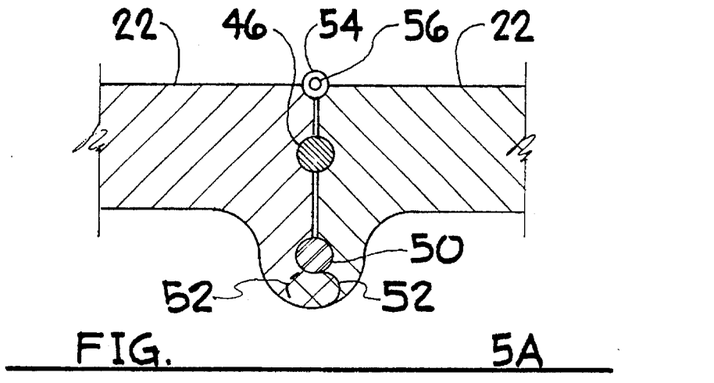
FIGS. 5A, 5B, and 5C are enlarged longitudinal sections showing various aspects of the mechanism that fastens the hinged middle of the lid assembly down to the front and rear walls of the enclosed storage compartment.
Figure 5B:
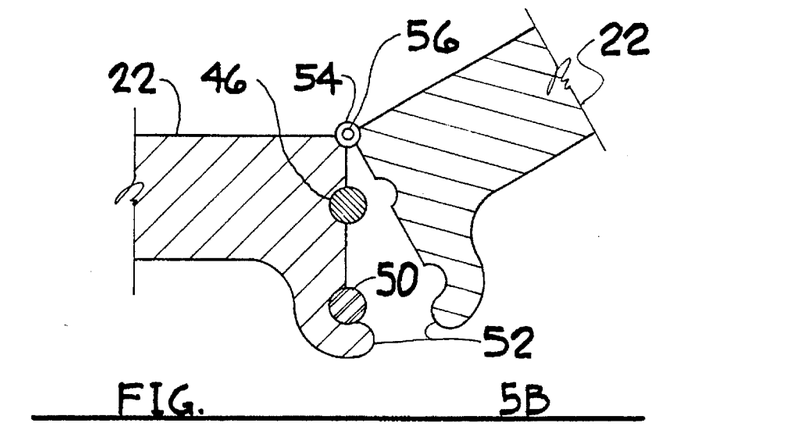
Figure 5C:
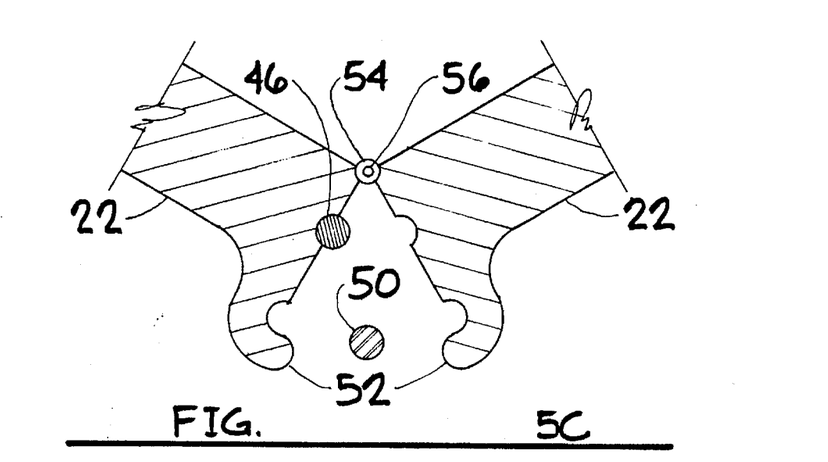

Section symbol "5—5" in FIG. 4 indicates FIGS. 5A, 5B, and 5C, which are enlarged longitudinal sections showing the construction and operation of this grabbing mechanism.

The two lid-halves 22 are shown. Each lid-half 22 terminates in a number of knuckles 54, which, together with a hinge-pin 56, form a hinge continuous from front to rear of lid assembly 20 along the longitudinal centerline of the pickup truck. Between lid-halves 22 is a conventional gasket 46 to keep water and dust out of the enclosed storage compartment.

Connected to each lid-half 22 are two (2) curved claws 52, one near rear panel 24 and one near front wall 38. Each claw 52 is shaped to fit around pin 50. The four claws 52 together fasten down lid-halves 22, and thus the center of the entire lid assembly 20, by grabbing both pins 50.

FIG. 5A shows the grabbing mechanism with both lid-halves 22 closed, and claws 52 grabbing pin 50 from both sides.

FIG. 5B shows that when one lid-half 22 is opened far enough, its claws 52 no longer grab pins 50; however, claws 52 on the other lid-half 22 still do, so the entire lid assembly 20 is held down by claws 52 grabbing pins 50, plus the engagement of tongues 48 into grooves 44, plus latch 26, in the lid-half 22 not opened.

FIG. 5C shows that when both lid-halves 22 are opened at the same time, then all four claws 52 release both pins 50; thus the entire lid assembly 20 can be lifted away and placed for storage in its recess in front wall 38.

Operation of the Invention

The convertible cargo bed is shown in FIG. 1A in the partially-enclosed position. Each lid-half 22 has on its distal end a latch 26. To gain access to the enclosed storage compartment, one or the other lid-half 22 is opened by unlocking lid-half latch 26 with a key and then operating it by hand. (It could also be unlocked and operated by some remote-control means.) When a lid-half is unlatched it can be raised to "open" position 34, then closed at will and locked for security. A conventional mechanism holds the lid-half open when necessary.

To convert the cargo bed to the fully-open position, both lid-halves 22 are opened, at the same time, past "open" position 34, until they meet at "convert" position 36. At this point claws 52 release their hold on pins 50, as described above in the discussion of FIG. 5. Now the entire lid assembly 20 is lifted away and stored in its recess in the aft face of front wall 38, as described in detail on page 12, above.

Rear panel 24 is hinged along its bottom edge to cargo-bed floor 14. Now rear panel 24 is swung on its hinge forward and downward to a substantially horizontal position, becoming substantially flush with floor 14 and essentially continuing floor 14 forward nearly all the way to front wall 38. Master latch 32 now catches and holds rear panel 24, which in turn traps lid assembly 20 in its storage recess. The cargo bed is now functionally equivalent to an ordinary one, fully open for carrying cargo, as shown in FIG. 1C. However, auxiliary storage compartment 40 is still available for storage of small items under the forward section of the cargo bed.

An important feature of the convertible pickup-truck cargo bed is that rear panel 24 and lid assembly 20, being both provided with storage aboard the truck, are instantly available any time there is a need to convert the cargo bed back to the partially-enclosed position.

To convert the cargo bed back to the partially-enclosed position, master latch 32 is operated to unlock and unlatch rear panel 24 from its laid-down position. Next, rear panel 24 is swung up on its hinge to a substantially vertical position, releasing lid assembly 20. Next, lid assembly 20 is lifted out of its storage recess in the aft face of front wall 38, folded double at its hinge, and placed, hinged joint down, with one opposed pair of claws 52 above pin 50 in rear panel 24, and the other opposed pair of claws 52 above pin 50 in front wall 38. Next, both lid-halves 22 are swung out and down, causing claws 52 to grab pins 50 as described in detail on page 14, above. Lid-half latches 26 latch and lock lid-halves 22 to right and left sides 10 and 12 (or to side door(s) 30) and the cargo bed is now converted back to the partially-enclosed position.

CONCLUSIONS, RAMIFICATIONS AND SCOPE

Accordingly, the reader can see that the convertible pickup-truck cargo bed herein disclosed has a number of advantages over the prior art:

(a) it is built by the truck manufacturer, so that it is structurally and esthetically integrated into the design of the pickup truck;

(b) it can be used in a fully-open position for carrying cargo, with the extra advantage of an auxiliary storage compartment underneath the forward section of the cargo bed;

(c) it can be quickly and easily converted, without tools, to a partially-enclosed position, in which it retains most of its open cargo-carrying space, but also has a large, enclosed, secure, and weather-resistant storage compartment for luggage or other items;

(d) its movable panels are stored aboard the pickup truck, so conversion back to the partially-enclosed position can be performed anywhere;

(e) its design allows short drivers to look over it to see to the rear;

(f) its design allows the installation of truck caps;

(g) its design accommodates the installation at the factory of a hinged side door in either or both sides of the forward section of the cargo bed, for easier access;

(h) its design is adaptable to all styles of pickup-truck cargo beds and all styles of pickup-truck cabs;

(j) its design allows easy access to the enclosed storage compartment from both sides of the pickup truck; and (k) its movable panels can be removed from the pickup truck to facilitate the installation of an auxiliary passenger seat in the cargo bed.

While the above description contains many specificities, these should not be construed as limitations on the scope of the invention, but rather as an exemplification of the preferred embodiment thereof. Many other variations are possible. Accordingly, the scope of the invention should be determined not by the embodiments illustrated, but by the appended claims and their legal equivalents.

What is claimed is:

1. In a pickup truck with a frame, cab, and drive train of conventional construction, and a cargo bed comprising a pair of substantially vertical, longitudinally extending side walls, a substantially vertical, laterally extending front wall longitudinally rearwardly spaced from the rear wall of said cab, and a substantially horizontal, laterally and longitudinally extending floor panel; the improvement wherein said cargo bed is constructed to be convertible from a fully-open position to a partially-enclosed position and back again, and in said partially-enclosed position has:

(a) an approximately vertical rear panel, extending substantially between said side walls and from said floor panel to the upper edges of said side walls, and longitudinally rearwardly spaced from said front wall by a distance approximately equal to the vertical distance from said floor panel to the upper edges of said side walls;

(b) a substantially horizontal, laterally extending lid assembly which rests on the upper edges of said front wall and of said side walls and of said rear panel of said cargo bed; and (c) an upwardly facing concavity in said floor panel, said concavity having a bottom wall substantially below the lowermost downwardly facing surface of said floor panel; substantially between said side walls, and substantially between said front wall and said rear panel;

so that (d) said rear panel, said lid assembly, and said concavity, together with said side walls and said front wall of said cargo bed, form an enclosed storage compartment when said cargo bed is converted to said partially-enclosed position, and (e) said lid assembly and said rear panel are capable of being relocated between purpose-made locations in said cargo bed, to accomplish the conversion of said cargo bed from said partially-enclosed position to said fully-open position, or vice versa.

2. The cargo bed of claim 1, further including in the aft face of said front wall a storage recess shaped such that said lid assembly may be placed in said recess for storage aboard said pickup truck; and further including a hinged connection of said rear panel to said floor panel, permitting said rear panel to be folded forward and downward to a substantially horizontal position generally flush with said floor panel; thereby trapping said lid assembly in said storage recess, and completing the conversion of said cargo bed from said partially-enclosed position to said fully-open position; conversion of said cargo bed back from said fully-open position to said partially-enclosed position being accomplished by folding said rear panel upward and backward to a substantially vertical position, removing said lid assembly from said storage recess, and placing said lid assembly in its position on the upper edges of said front wall and of said side walls and of said rear panel of said cargo bed.

3. The cargo bed of claim 1, wherein the bottom wall of said concavity in said floor panel is higher than said pickup truck's frame, exhaust system, and driveshaft, but low enough to provide an auxiliary storage compartment underneath said rear panel when said cargo bed is converted to said fully-open position.

4. The cargo bed of claim 1, wherein said lid assembly is divided near its center into a pair of substantially identical lid-halves hingedly connected together and equipped at their distal ends with latches; whereby said lid assembly can be latched or locked to said upper edges of said side walls, and unlocked or unlatched from said upper edges of said side walls to permit said lid assembly to be opened.

5. The cargo bed of claim 4, further including a projection or pin attached to said front wall, near the longitudinal centerline of said cargo bed and slightly below the top surface of said front wall.

6. The cargo bed of claim 4, further including a projection or pin attached to said rear panel, near the longitudinal centerline of said cargo bed and slightly below the top surface of said rear panel.

7. The cargo bed of claim 4, further including on the underside of each of said lid-halves, near each end of said hinged joint, a hook or claw, said hooks or claws being so arranged as to grab and hold each of said pins from opposite sides; whereby said lid assembly is held down onto the rest of said cargo bed as long as at least one lid-half is in a generally horizontal position; but whereby said lid assembly is released to be lifted away from said cargo bed when both of said lid-halves are raised at the same time.

8. The cargo bed of claim 4, further including a groove on the underside of each of said lid-halves, near and substantially parallel to each of the edges of said lid-halves except those along said hinged joint, a tongue is provided on each of said front wall, said rear panel, and said side walls engageable with a corresponding groove on the underside of said lid-halves whereby, when said lid-halves are in generally horizontal positions enclosing said storage space, said lid-halves and said front wall and said rear panel and said side walls are locked together and prevented from moving horizontally relative to each other by the engagement of said tongues into said grooves.

* * * * *

UNITED STATES PATENT AND TRADEMARK OFFICE
CERTIFICATE OF CORRECTION

PATENT NO. : 5,464,264
DATED : November 7, 1995
INVENTOR(S) : Raymond T. Wilson

It is certified that error appears in the above-indentified patent and that said Letters Patent is hereby corrected as shown below:

Column 5, line 54, please delete "56 gasket" and substitute --46 gasket--.

Column 10, line 67, please delete "joint, a tongue" and substitute --joint; and a tongue--.

Signed and Sealed this

Thirty-first Day of December, 1996

*Attest:*

BRUCE LEHMAN

*Attesting Officer*   *Commissioner of Patents and Trademarks*